United States Patent [19]
Ward

[11] 3,782,679
[45] Jan. 1, 1974

[54] SPLIT MOULD WITH HINGED UPPER PART

[75] Inventor: John David Ward, Worcester, England

[73] Assignee: Precision Engineering (Worcester) Limited, Worcester, England

[22] Filed: July 15, 1971

[21] Appl. No.: 162,848

[52] U.S. Cl. .............................. 249/170, 164/339
[51] Int. Cl. ............................................. B22d 33/04
[58] Field of Search ................... 249/170, 160, 161, 249/205; 164/137, 339, 341, 342, 119

[56] References Cited
UNITED STATES PATENTS

| | | | |
|---|---|---|---|
| 332,503 | 12/1885 | Davies | 164/342 |
| 1,999,961 | 4/1935 | Daesen et al. | 164/119 |
| 3,343,592 | 9/1967 | Vogel | 164/260 |
| 1,072,158 | 9/1913 | Pettigrew | 249/161 X |

FOREIGN PATENTS OR APPLICATIONS

| | | | |
|---|---|---|---|
| 283,170 | 4/1915 | Germany | 164/342 |

Primary Examiner—R. Spencer Annear
Attorney—Young & Thompson

[57] ABSTRACT

A carrier for a split mould comprises separable parts brought together in accurate alignment by a coupling linkage providing relative movement along a path of radius of curvature large compared to the dimensions of the mould parts and the linkage, thereby avoiding long radius arms.

The linkage may comprise a pin-and-slot connection, with spaced pins or rollers running in an arcuate slot. The slot may be extended in a hook shape to hold the parts open. The opening movement may be cushioned to reduce shock on the pin-and-slot connection.

The mould carrier is applicable, for example, to moulding the root and peripheral profiles of compressor, turbine and fan blades.

3 Claims, 3 Drawing Figures

PATENTED JAN 1 1974  3,782,679
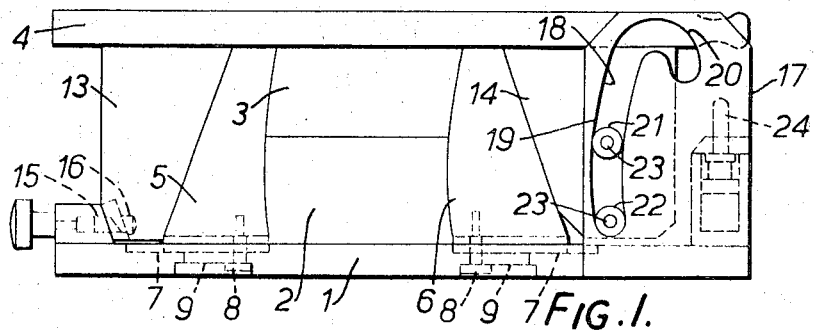
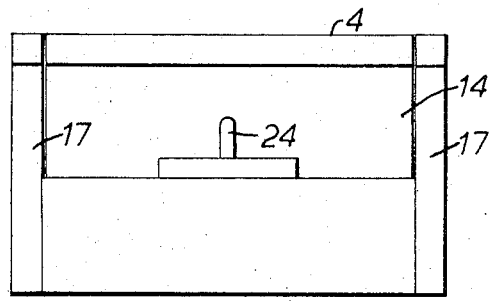
FIG. 3.
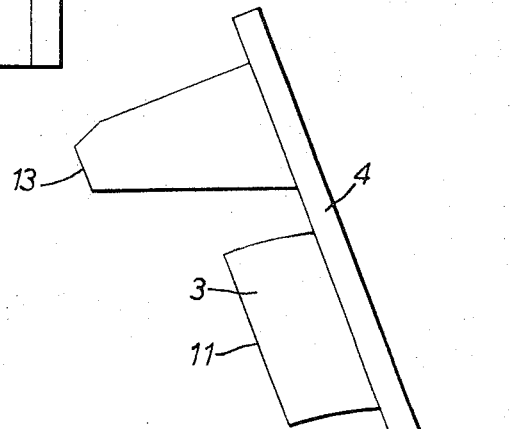
FIG. 2.
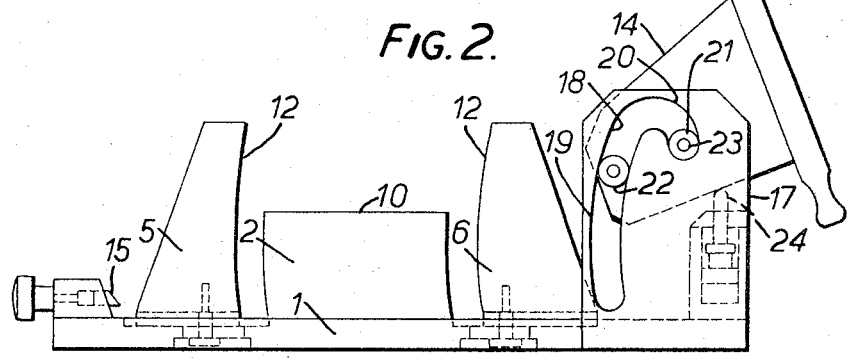

SPLIT MOULD WITH HINGED UPPER PART

BACKGROUND OF THE INVENTION

This invention relates to split moulds, and to mould carriers for such moulds.

The parts of a split mould have to be separated to remove the moulded articles, and after a moulding has been removed the parts have to be reassembled in accurate alignment ready for the next moulding procedure. Even when a straight vertical separation of upper and lower mould parts will suffice, the parts being accurately aligned by dowels, problems occur in handling and refitting the removed upper part particularly with large heavy moulds and the task becomes one precluding the use of female labour.

In some cases opposite end profiles of the mouldings are radiused about a common centre offset from the mould, an example being the root and peripheral profiles of compressor, turbine and fan blades. It is thus necessary to separate the mould parts by relative arcuate movement about said centre, and the parts are at present hinged together about a hinge axis passing through that centre. The result is a mould carrier with hinge arms which may be of very considerable radius, thus introducing space problems in fitting to the moulding machine and weight problems in opening a heavy mould at the end of long radius arms.

The object of the invention is to provide a split mould, or mould carrier, with parts which are readily moved apart and reassembled in accurate alignment and which, when relative arcuate movement about an offset centre is necessary, has much reduced overall dimensions comparable to the dimension of the mould itself.

SUMMARY OF THE INVENTION

According to the invention the mould carrier preferably comprises support members for parts of the split mould which support members are in pin-and-slot connection, one of the support members having spaced parallel projections or rollers running in a slot in the other part, to hold the parts of the mould one to the other for relative separating and closing movement in a path of large radius of curvature determined by the curvature of the slot. To this end the slot is arcuate and of large radius of curvature. In the limiting case the latter is infinite and the slot is straight sided.

In a preferred form of the invention, a base constituting a support member for one of the mould parts has slotted cheeks between which is located a portion of a swinging arm constituting the second support member and having pairs of outwardly projecting pins or pin-mounted rollers riding in the slots of the cheeks. Additional mould parts may be slidably mounted on the base, for example to embrace the sides of the facially engaging mould parts respectively disposed on the base and the swinging arm. In this case, the swinging arm may have wedges upon it for holding the additional mould parts in position. A spring catch may be provided for holding the swinging arm down upon the base. A buffer, for example a spring-loaded plunger, may be provided to cushion the swinging arm in its fully raised position and so to relieve the pin-and-slot connections from shock.

The slots in the cheeks have a radius of curvature providing the effect of a radius arm. Alignment of the facially engaging mould parts is readily attained by close fitting of the cheeks, and suitable spacing of the pins or pinned rollers of each pair. The slots in the cheeks are preferably extended in a hook shape of small radius of curvature so that in the raised position of the swinging arm, the upper pins or pinned rollers drop and the swinging arm reaches a stable mould-open position.

An embodiment of the invention, comprising a carrier for a split mould for the forming of fan blades, will now be described by way of example and with reference to the accompanying drawings.

BRIEF DESCRIPTION OF THE DRAWING

FIG. 1 is a side view of the mould and carrier in the closed state,

FIG. 2 is a similar view of the mould and carrier in the open state and

FIG. 3 is an end view corresponding to FIG. 1.

DESCRIPTION OF THE PREFERRED EMBODIMENTS

Referring to the drawings, the mould carrier comprises a base plate 1 carrying the main lower part 2 of a split mould, this lower part 2 facially engaging an upper mould part 3 carried on a plate 4 constituting a swinging arm. Side elements 5 and 6 of the mould are mounted on the base plate 1 in slides 7 and held by studs 8 which move in slots 9. The mould is closed, to provide a cavity between the faces 10 and 11 (FIG. 2) of mould parts 2 and 3 and bounded by faces 12 of the side elements 5 and 6, by sliding elements 5 and 6 into contact with the mould part 2 and lowering the plate 4 from its open position shown in FIG. 2. Wedging blocks 13 and 14 are fixed to plate 4 to hold the side mould elements 5 and 6 firmly against the sides of the mould parts 2 and 3 in the closed state of the mould shown in FIG. 1. A spring catch 15 engages an aperture 16 in the wedging block 13 to hold the structure in the closed state during the moulding operation.

The swinging motion of the plate 4 is provided for by linkage in the following way. The block 14 on plate 4 fits closely between a pair of cheeks 17 upstanding from the base plate 1. The cheeks 17 have similar through-slots 18 with arcuate portions 19, the radius of curvature of which is of the order of the depth dimension of the structure, that is, the distance from the opening end to the linked end of the plate 4. The top end portion 20 of each of the slots 18 curves in a small radius. On each side of the block 14, two spaced rollers 21 and 22 are attached by pins 23, which rollers ride in the slots 18. When the two rollers on each side lie in the arcuate portions 19 of the slots 18, the plate 4 constituting the swinging arm is constrained to angular motion about that axis outside the structure which is the centre of curvature of the arcuate portions 19 of the slots 18. Hence the motion is effectively that of a long radius arm. When the plate 4 is fully raised to open the mould the uppermost roller 21 on each side of the block 14 drops into the sharply curved end portion 20 of the corresponding slot 18 so that the swinging arm is held in the raised position. A buffer in the form of a spring-loaded plunger 24 engages the rear face of the block 14 when the swinging arm is raised and serves to reduce shock and wear at the pin-and-slot connections constituted by the rollers 21 and 22 and the slots 18.

I claim:

1. A split mould having a base supporting a base mould part, a swinging arm carrying an upper mould part to be lowered on to the base mould part and to be raised and swung backwardly clear thereof for access to the base mould part and pin-and-slot hinging means located between said base and said arm clear of the mould parts and to the rear thereof, said hinging means comprising at each side of the mould two spaced parallel and laterally projecting pins or pin-mounted rollers fixed to said arm and a cooperating guide slot upwardly extending from said base and terminating in a rearwardly and downwardly extending hook-shaped portion, the two pins or pin-mounted rollers riding in the guide slot to define a desired closing and opening path of said arm and upper mould part and to hold said arm in a stable mould-open position.

2. A split mould according to claim 1, including additional mould parts slidably mounted on said base and members fixedly attached to said swinging arm which members have wedging surfaces for holding the additional mould parts in position for moulding.

3. A split mould according to claim 1, including cushioning means for said swinging arm in its fully raised position to relieve the pin-and-slot hinging means from shock.

* * * * *